United States Patent
Ustunel

(10) Patent No.: US 11,958,424 B2
(45) Date of Patent: Apr. 16, 2024

(54) VEHICULAR COLLISION DETECTION SYSTEM WITH SAFETY FEATURE CONTROL FUNCTIONS RESPONSIVE TO ESTIMATION OF COLLISION SEVERITY

(71) Applicant: Magna Electronics Inc., Auburn Hills, MI (US)

(72) Inventor: Eser Ustunel, Heidelberg (DE)

(73) Assignee: Magna Electronics Inc., Auburn Hills, MI (US)

( * ) Notice: Subject to any disclaimer, the term of this patent is extended or adjusted under 35 U.S.C. 154(b) by 329 days.

(21) Appl. No.: 17/302,511

(22) Filed: May 5, 2021

(65) Prior Publication Data
US 2021/0347321 A1 Nov. 11, 2021

Related U.S. Application Data

(60) Provisional application No. 63/198,710, filed on Nov. 6, 2020, provisional application No. 62/705,343, filed
(Continued)

(51) Int. Cl.
*B60R 21/0134* (2006.01)
*B60R 21/01* (2006.01)
(Continued)

(52) U.S. Cl.
CPC .......... *B60R 21/0134* (2013.01); *G06F 18/24* (2023.01); *G06T 7/20* (2013.01); *G06T 7/70* (2017.01); *G06V 20/58* (2022.01); *G06V 40/103* (2022.01); *B60R 2021/01218* (2013.01); *B60R 2021/01345* (2013.01); *G01S 13/867* (2013.01);
(Continued)

(58) Field of Classification Search
CPC ...... B60R 21/0134; B60R 2021/01218; B60R 2021/01345; G06F 18/24; G06T 7/20; G06T 7/70; G06T 2207/30196; G06T 2207/30261; G06V 20/58; G06V 40/103; G06V 2201/08; G01S 13/867; G01S 13/931; G01S 2013/9323; G01S 2013/9324

See application file for complete search history.

(56) References Cited

U.S. PATENT DOCUMENTS 5,550,677 A 8/1996 Schofield et al.
5,670,935 A 9/1997 Schofield et al.
(Continued)

*Primary Examiner* — Ig T An
(74) *Attorney, Agent, or Firm* — HONIGMAN LLP

(57) ABSTRACT

A vehicular safety feature control system includes a camera disposed at a vehicle that views exterior of the equipped vehicle. The vehicular safety feature control system includes an electronic control unit (ECU) for processing image data captured by the camera to detect presence of objects. The ECU, responsive to processing of image data captured by the camera, detects an object on a collision course with the equipped vehicle. The ECU, responsive to detecting the object on the collision course with the equipped vehicle, classifies the detected object. The ECU estimates a mass of the detected object based on the classification. The ECU estimates a kinetic energy of a potential collision and, based on the estimated kinetic energy of the potential collision, estimates a severity of the potential collision. The ECU controls a safety feature of the equipped vehicle based on the estimated severity of the potential collision.

19 Claims, 6 Drawing Sheets

Related U.S. Application Data on Jun. 23, 2020, provisional application No. 62/704,354, filed on May 6, 2020.

(51) Int. Cl.

| | | |
|---|---|---|
| *G01S 13/86* | (2006.01) |
| *G01S 13/931* | (2020.01) |
| *G06F 18/24* | (2023.01) |
| *G06T 7/20* | (2017.01) |
| *G06T 7/70* | (2017.01) |
| *G06V 20/58* | (2022.01) |
| *G06V 40/10* | (2022.01) |

(52) U.S. Cl.
CPC ..... *G01S 13/931* (2013.01); *G01S 2013/9323* (2020.01); *G01S 2013/9324* (2020.01); *G06T 2207/30196* (2013.01); *G06T 2207/30261* (2013.01); *G06V 2201/08* (2022.01)

(56) References Cited

U.S. PATENT DOCUMENTS

| | | |
|---|---|---|
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,036,026 B2 | 5/2015 | Dellantoni et al. |
| 9,126,525 B2 | 9/2015 | Lynam et al. |
| 9,174,574 B2 | 11/2015 | Salomonsson |
| 9,900,490 B2 | 2/2018 | Ihlenburg et al. |
| 10,071,687 B2 | 9/2018 | Ihlenburg et al. |
| 10,099,614 B2 | 10/2018 | Diessner |
| 2004/0061598 A1* | 4/2004 | King ............... B60R 21/013 340/435 |
| 2006/0052924 A1* | 3/2006 | Prakah-Asante ... B60R 21/0134 701/45 |
| 2015/0274108 A1* | 10/2015 | Iguchi ............ B60R 21/0134 280/729 |
| 2016/0236638 A1* | 8/2016 | Lavie ................ G08G 7/00 |
| 2018/0293449 A1* | 10/2018 | Sathyanarayana ....... G06N 7/01 |

\* cited by examiner

VEHICULAR COLLISION DETECTION SYSTEM WITH SAFETY FEATURE CONTROL FUNCTIONS RESPONSIVE TO ESTIMATION OF COLLISION SEVERITY

CROSS REFERENCE TO RELATED APPLICATIONS

The present application claims the filing benefits of U.S. provisional application Ser. No. 63/198,710, filed Nov. 6, 2020, U.S. provisional application Ser. No. 62/705,343, filed Jun. 23, 2020, and U.S. provisional application Ser. No. 62/704,354, filed May 6, 2020, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 9,174,574; 5,949,331; 5,670,935 and/or 5,550,677, which are hereby incorporated herein by reference in their entireties.

SUMMARY OF THE INVENTION

A driving assistance system or vision system or perception system (PS) or fusion system or vehicular safety feature control system for a vehicle utilizes one or more sensors (e.g., perception sensors such as cameras, lidar, radar, ultrasonic sensors, etc.) to capture data representative of the scene and/or objects exterior of the vehicle, and includes an electronic control unit (ECU) including electronic circuitry and associated software. The electronic circuitry of the ECU includes an image processor for processing image data captured by a camera to detect presence of objects in the field of view of the camera. The control, responsive to processing by the processor of data captured by the camera, detects an object on a collision course with the vehicle and responsive to detecting the object on the collision course with the vehicle, classifies the detected object using the captured image data. Based on the classification, the ECU estimates a mass of the detected object. The ECU estimates a kinetic energy of a potential collision between the equipped vehicle and the detected object based on the estimated mass of the detected object and an estimated speed of the detected object relative to the equipped vehicle. The ECU, responsive to estimating the kinetic energy of the potential collision, estimates a severity of the potential collision and, responsive to estimating the severity of the potential collision, controls a safety feature of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system and/or vehicular safety feature control system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
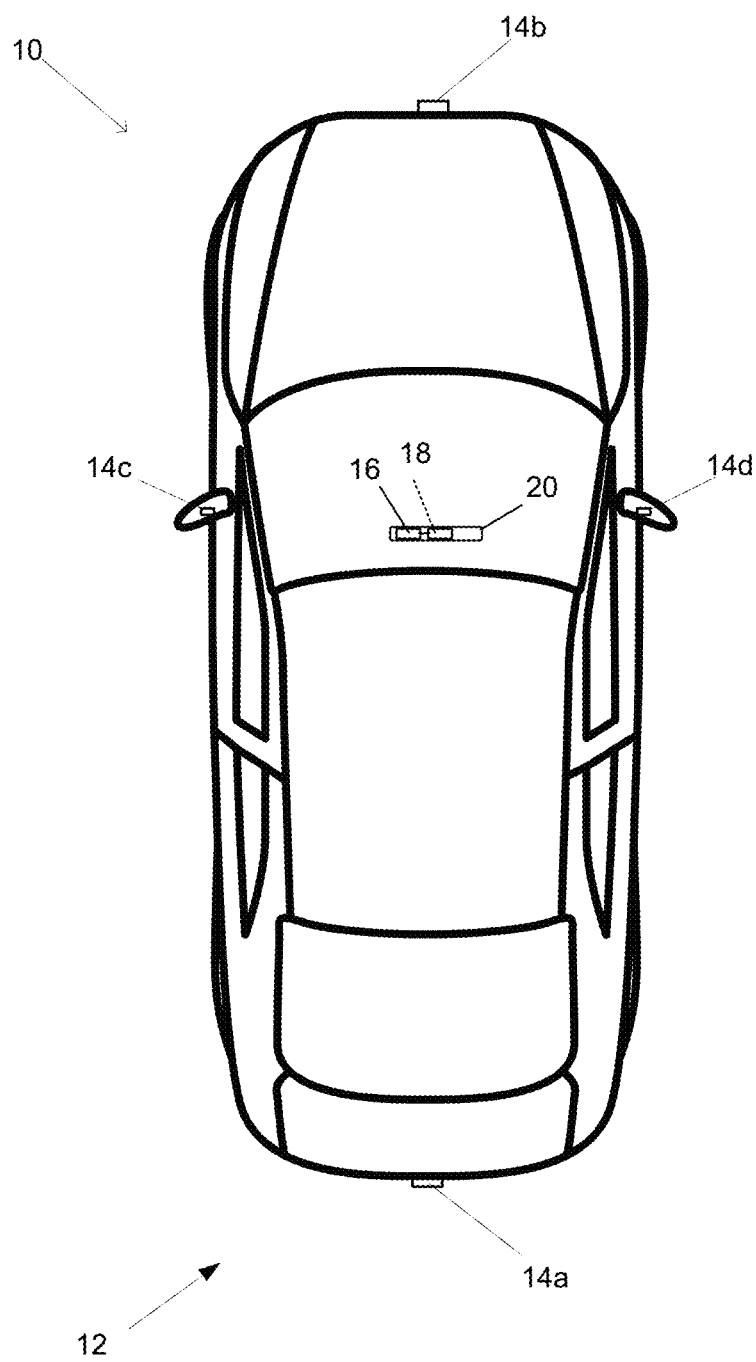
FIG. 1 is a plan view of a vehicle with a sensing and control system that incorporates cameras.

Referring now to the drawings and the illustrative embodiments depicted therein, a vehicle 10 includes a sensing system or vehicular safety feature control system 12 that includes at least one exterior viewing/sensing sensor, such as an imaging sensor or camera and/or radar sensor and/or ultrasonic sensor and/or lidar sensor, such as a rearward viewing imaging sensor or camera 14a (and the system may optionally include multiple exterior viewing imaging sensors or cameras, such as a forward viewing/sensing camera or sensor 14b at the front (or at the windshield) of the vehicle, and a sideward/rearward viewing/sensing camera or sensor 14c, 14d at respective sides of the vehicle), which captures images or sensor data exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras or sensors, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera or sensor to the ECU may comprise any suitable data or communication link, such as a vehicle network bus or the like of the equipped vehicle.

Modern vehicles are often equipped with an airbag ECU to control an active safety device for determining a severity of an accident as it is happening. Such a system typically uses mechanical sensors (MS) such as accelerometers, pressure sensors, etc. These sensors are usually located around a vehicle, and therefore the system requires a long and heavy cable harness. Based on readings from the mechanical sensors during the accident (e.g., the amplitude of pressure or crushing), the airbag ECU determines whether and which airbags to deploy, whether to tighten the seat belt, etc.

The majority of accidents are complete inelastic collisions. That is, in most accidents, both vehicles stick and move together. The total kinetic energy (KE) of colliding vehicles is converted to heat, sound, friction and forces that cause damage to the vehicles. Therefore, estimating the kinetic energy of all vehicles reveals information regarding a collision magnitude of the accident (i.e., a severity of the accident). The parameters of KE include mass and velocity, and may be obtained by a perception system that includes artificial intelligence (AI) (i.e., machine learning such as a neural network).

Figures 2, 3:
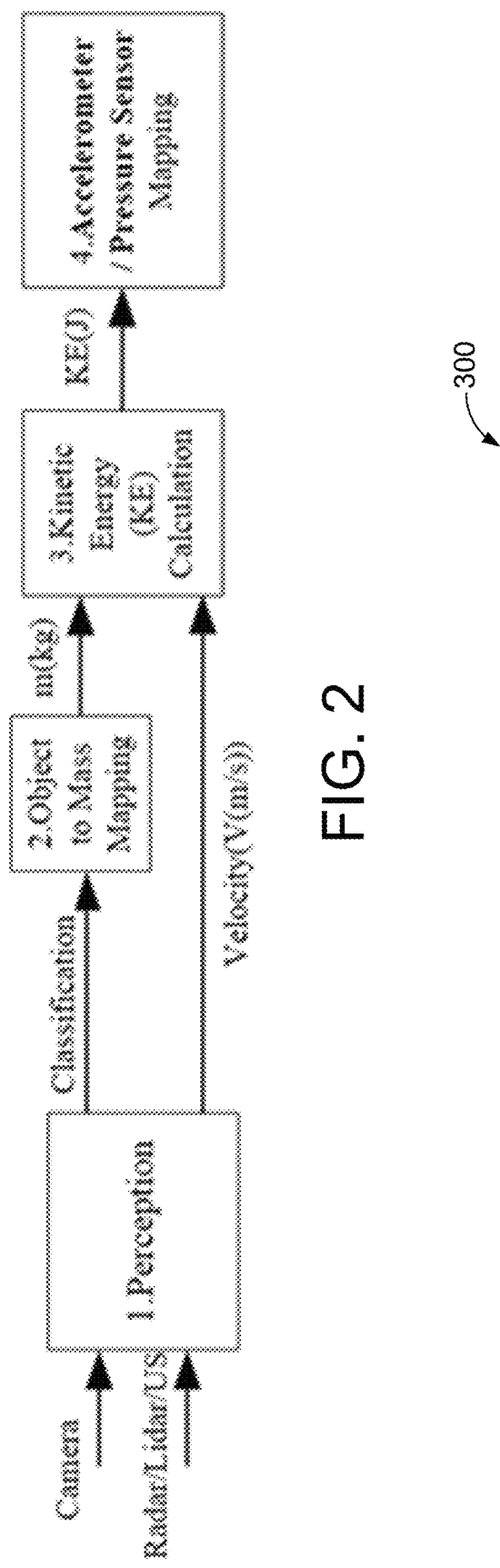
FIG. 2 is a block diagram of the sensing and control system.
FIG. 3 is a table of masses for various other objects.

The perception system may determine velocity and classification of objects (e.g., other vehicles). Object classification may be smartly mapped to a coarse mass estimation of detected objects (FIG. 2). Kinetic energy, which the perception system may determine immediately before the collision, may be compared with the readings of accelerometer and pressure sensors or system output of mechanical sensors (e.g., accelerometer and pressure sensors) taken during the accident to calibrate the perception system (e.g., apply a constant (i.e., $K_1$ as described below) to an output of the perception system) for a better damage approximation. Implementations herein correlate kinetic energy with accident severity and/or damage proportional to the regular accelerometer/pressure sensors monitored by an airbag ECU. Kinetic energy may be further quantized to define accident magnitude levels.

Referring now to FIG. 2, the vehicle 10 is equipped with a plurality and/or fusion of perception sensors (PS) such as radar sensors, lidar sensor, ultrasonic sensors, cameras, and/or the like. The sensors provide a 360 degree field of sensing around the vehicle to detect objects (e.g., vehicle detection and/or recognition). The perception system processes the sensor data from each sensor. The sensors provide relative speed estimation with respect to detected objects. For example, a radar/lidar/ultrasonic sensor may determine a relative velocity of an object (e.g., in meters per second) while a lidar/camera sensor classifies the object. That is, the system may determine the speed of the detected object relative to the equipped vehicle based on the sensor data (e.g., by comparing determined distances, such as determined via a ranging system, such as a radar sensor or lidar sensor) between the vehicle over known time periods). Based on the relative speed differences between the equipped vehicle and the detected object, the system may determine an actual velocity of the detected object. For example, the system may determine the actual velocity of the equipped vehicle (e.g., via receiving speed data from a wheel speed sensor or other speed sensor) and determine the actual velocity of the other vehicle using the actual velocity of the equipped vehicle and the relative velocity difference between the equipped vehicle and the detected object. Based on the classification (and associated estimated mass) and the relative velocity, the perception system performs a kinetic energy calculation for correlation with accelerometer and/or pressure sensor mapping (i.e., MS mapping).

Referring now to FIG. 3, the system may use a table such as table 300 to estimate a mass of the classified object. The table 300 includes approximate masses for different object classifications (e.g., a pedestrian, a motorbike, a small car, etc.). The table also includes a velocity square value for a velocity of 30 meters per second (108 kilometers per hour) to compare with mass values. That is, the perception system may classify a detected object, then based on the classification, select an appropriate mass for the object based on the table. For example, when the perception vision detects an object and classifies the object as a pedestrian, the perception system may assume a mass of 70 kilograms for the object.

Thus, the perception system may correlate KE with mechanical sensors (e.g., accelerometers, pressure sensors, etc.). The perception system may estimate the KE of a potential collision prior to the collision occurring and map the estimated KE value to the mechanical sensors (or to the system output of mechanical sensors) to determine how severe the imminent collision may be. Based on the estimate of the KE of the potential collision, the system may determine or estimate a severity of the potential collision.

The standalone kinetic energy (KE) of an object is given by Equation 1:

$$KE = \tfrac{1}{2} m V^2 \qquad (1)$$

In Equation 1, m is mass in kilograms and V is velocity in meters per second. Based on Equation 1 and table 300 (FIG. 3), it is apparent that for bigger vehicles, the mass parameter is more effective than velocity for damage estimation. The table 300 applies to other vehicles (i.e., vehicles detected by the host or equipped vehicle). The mass and speed of the equipped or ego vehicle may be measured or estimated by the ego or host or equipped vehicle as well as by sensors located on or within the vehicle (e.g., the unloaded vehicle mass may be known and then the current mass may be estimated based at least in part on seat occupant sensors, fuel level sensors and the like).

Figure 4:
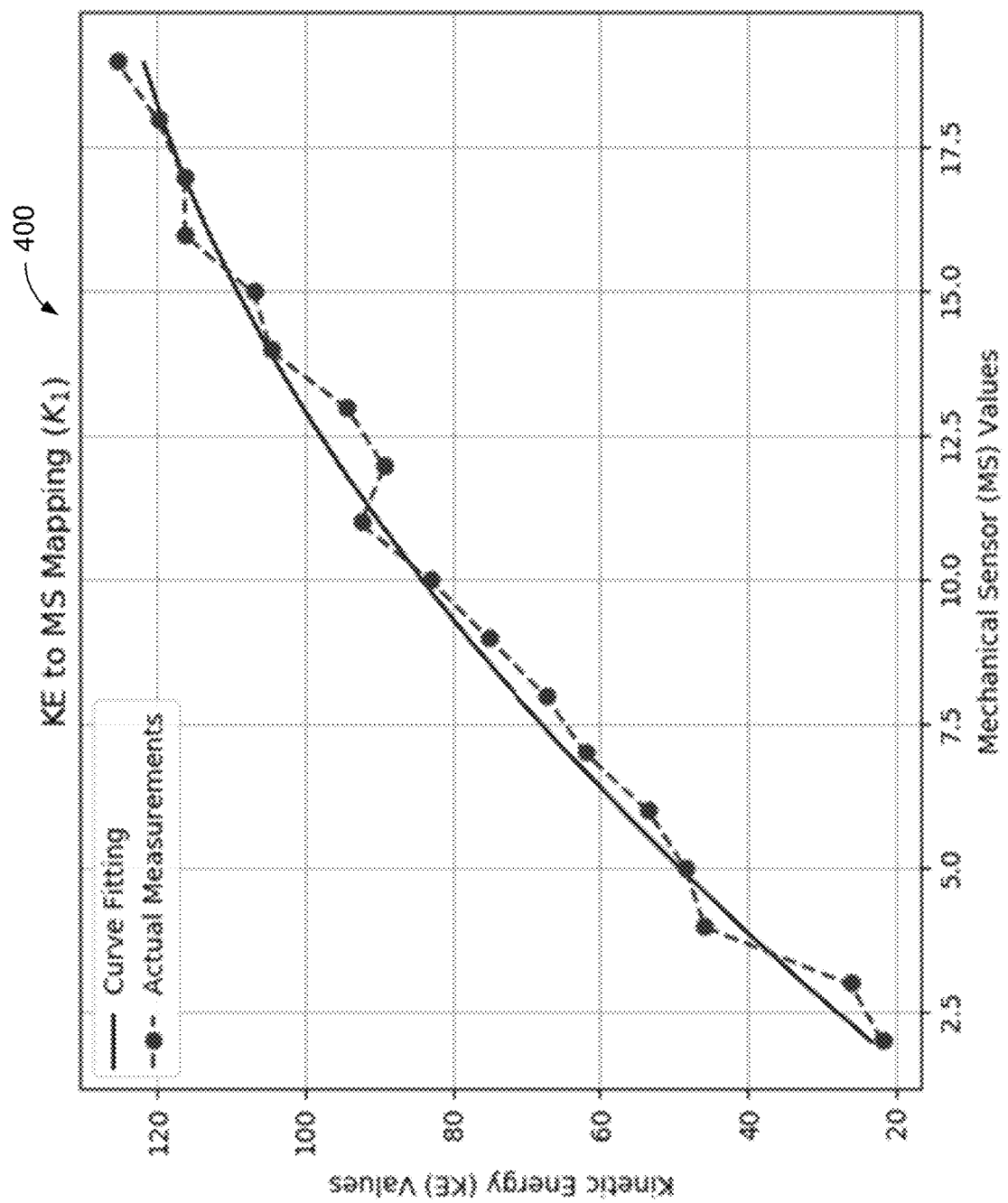
FIG. 4 is a plot of kinetic energy versus sensor output of a mechanical sensor.

Referring now to FIG. 4, there is a correlation between KE values and traditional airbag ECU sensors' measurements. This correlation is defined by parameter $K_1$. Plot 400 illustrates the kinetic energy of a crash versus measurements from a pressure sensor or accelerometer during the crash. It is apparent from plot 400 that as the KE of the collision increases, the measurements from the mechanical sensors (MS) similarly increases. The mapping parameter $K_1$ converts KE to accelerometer/pressure sensor readings as derived from plot 400. FIG. 4 illustrates a dashed plot with actual measurements between KE and accelerometer/pressure sensor (i.e., the mechanical sensors) values shown. A higher order polynomial may be used for a better curve fitting where the coefficients of polynomial are found by Least Squares (LS) estimation by using reading of sensors in crash tests. FIG. 4 illustrates a fitted curve as a continuous line in addition to the actual measurements as a dashed line. The plot 400 reveals that KE has valuable information before and during a crash. The mapping parameter $K_1$ may not be a single constant, and instead may be a dynamic value depending on accelerometer/pressure sensors values. Therefore, a nonlinear mapping approximated by a polynomial is possible as illustrated by the fitted curve in FIG. 4. Kinetic energy values may be converted or mapped to mechanical sensor values using the fitted curve. This mapping is advantageous because it does not change the current algorithms in an airbag ECU since the KE values are mapped to mechanical sensor measurements. To generate plots such as plot 400, optimally prior crash tests are conducted in a training phase/step to have actual measurements. Actual measurements are used to construct the fitted curve. Subsequently, points in the curve fitting of plot 400 may be used to map to the MS values and evaluate collision magnitude during potential accidents while the vehicle actually drives on roads.

Figure 5:
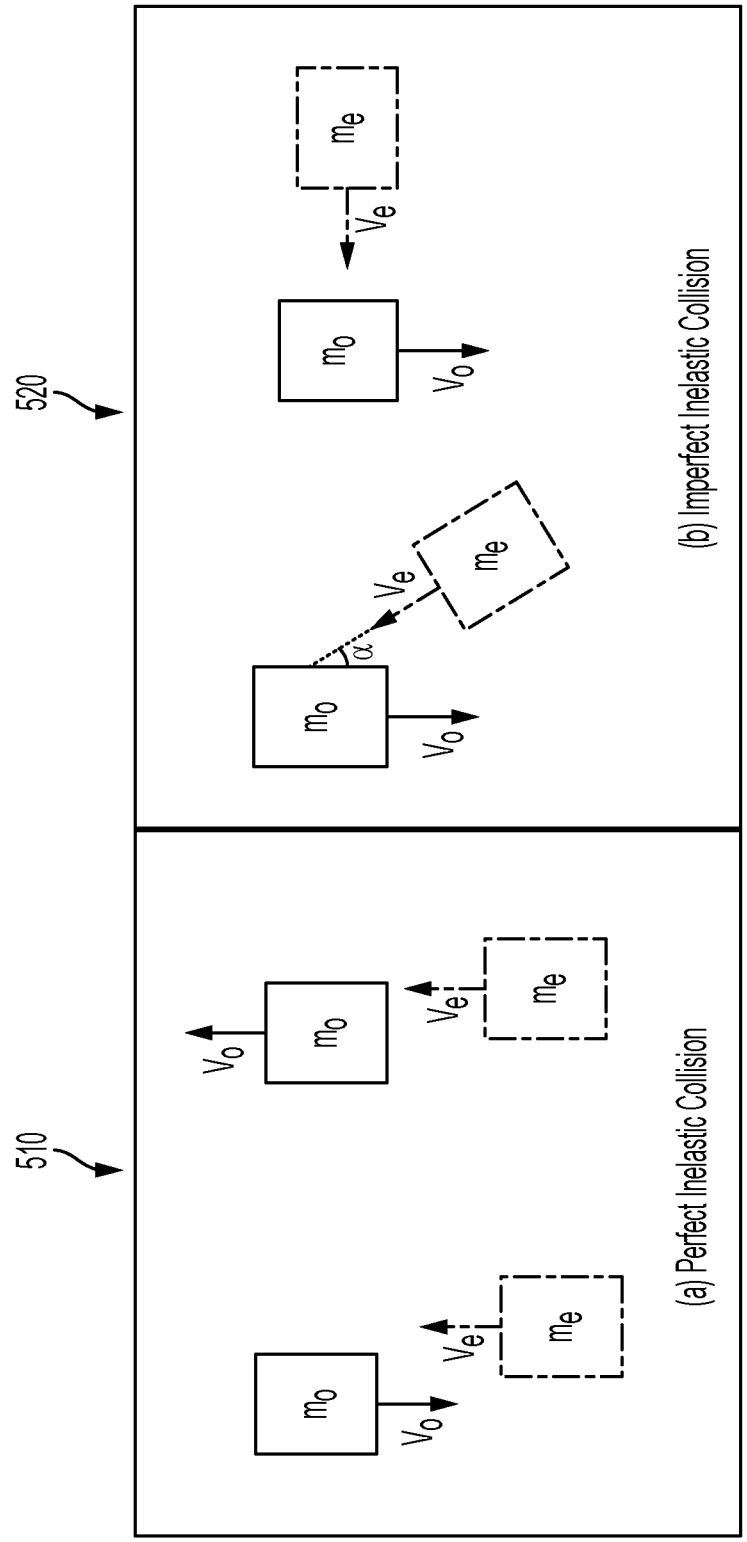
FIG. 5 is a schematic view of a perfect inelastic collision and an imperfect inelastic collision.

Referring now to FIG. 5, relative orientation and relative speed may be considered for exact damage estimation. In FIG. 5, a bounding box (BB) model is used for object representation for the subject vehicle and other vehicles. Here, collisions are assumed to be perfectly inelastic such that both bodies collide and stick and move together or imperfect inelastic such that both bodies collide and partially stick together and move partially separately (i.e., semi-separately). Accident severity for a perfect inelastic collision (PIC) in diagram 510 can be expressed as total KE functions, which are written in terms of the other vehicle ($m_o$, $V_o$) and the ego or subject or equipped vehicle ($m_e$, $V_e$) as:

$$KE(\alpha_1) = K_1(\tfrac{1}{2}m_o V_o^2 + \tfrac{1}{2}m_e V_e^2) \qquad (2)$$

$$KE(\alpha_2) = K_1(\tfrac{1}{2}m_e(V_e - V_o)^2) \qquad (3)$$

For imperfect inelastic collisions (IIC) in diagram 520, orientations of bounding boxes of the subject vehicle and other vehicles may be defined as:

$$E(b_1) = K_1(k_2 \tfrac{1}{2}m_o V_o^2 + k_3(\alpha)\tfrac{1}{2}m_e V_e^2) \qquad (4)$$

$$KE(b_2) = K_1(k_2 \tfrac{1}{2}m_o V_o^2 + \tfrac{1}{2}m_e V_e^2) \qquad (5)$$

Here, $k_2$ is a translational movement parameter where $0 \le k_2 \le 1$ when there exists a probability for another vehicle to move its direction for an imperfect sticking case with the ego vehicle. The parameter $k_3(\alpha)$, which depends on the $\alpha$ angle, is the reflection parameter where $0 \le k_3 \le 1$ when there exists a probability that the ego vehicle is reflected back from the other body during the collision. In this case, the collision is not a complete inelastic collision and not all KE is spent in the accident (i.e., some KE remains in the reflection direction). This case may be realized when a is small enough and the colliding bodies have certain orientations. The perception system may determine when this case is applicable based on the $\alpha$ angle.

For the case (represented by Equation (5)) illustrated in diagram 520, $k_3(\alpha)=1$ (i.e., there is no reflection probability because $\alpha=90°$).

Figure 7:
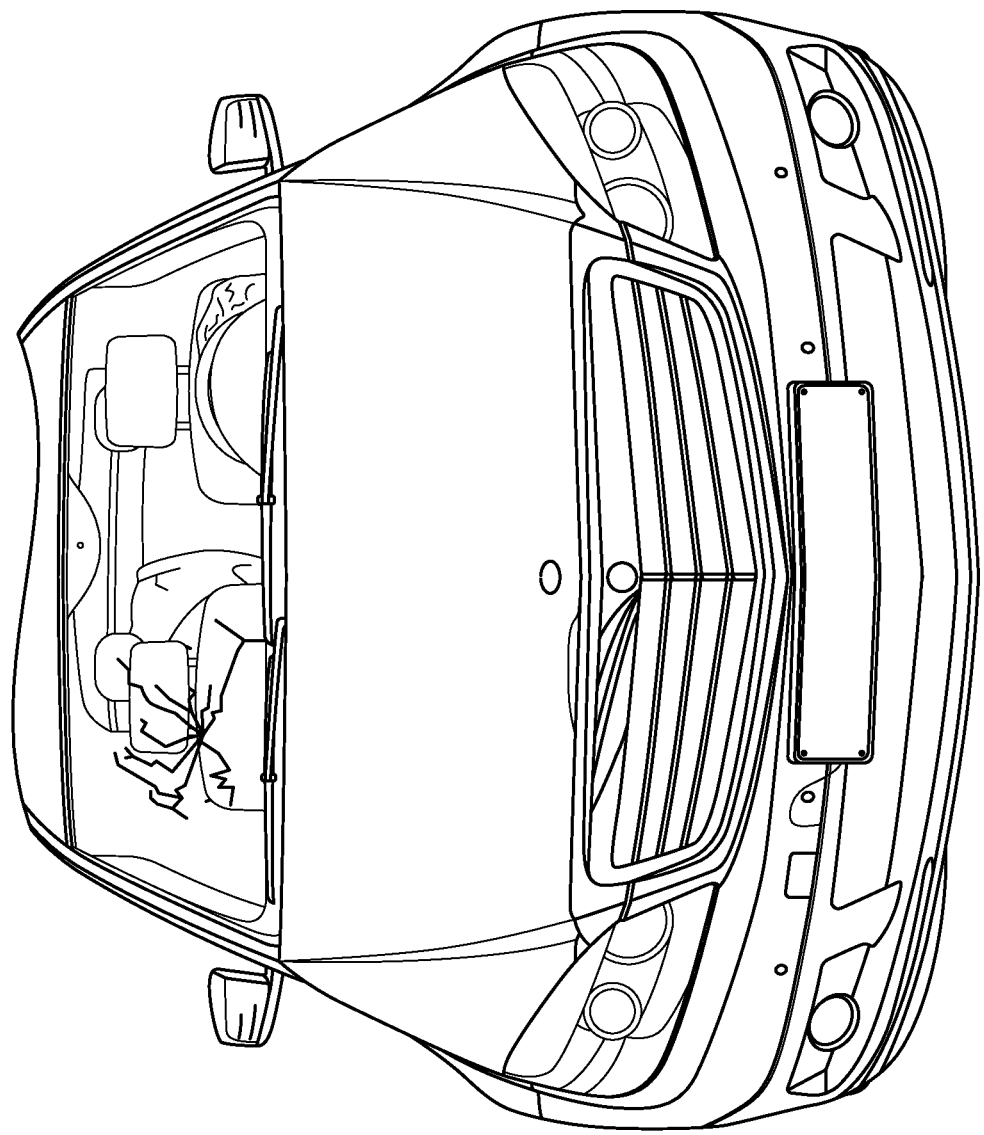
FIG. 7 is a perspective view of a vehicle after a collision.

The calibration parameters $K_1$, $k_2$, $k_3$ may be determined via crash test data. The calibration parameter $K_1$ is the conversion/mapping parameter and does not depend on the orientation of the bodies in the accident. This parameter converts KE to mechanical sensors domain and vice versa. The calibration parameters $k_2$, $k_3$ depend on orientation, which causes non-perfect inelastic collisions. The parameters $k_2$, $k_3$ reduce the KE value, however typically not close to 0. The parameters $k_2$, $k_3$ can be easily chosen since used thresholds in measurement for deciding an accident are very low in current airbag ECU applications (FIG. 7). Thus, there is more freedom to choose the parameters $k_2$, $k_3$.

Figure 6:
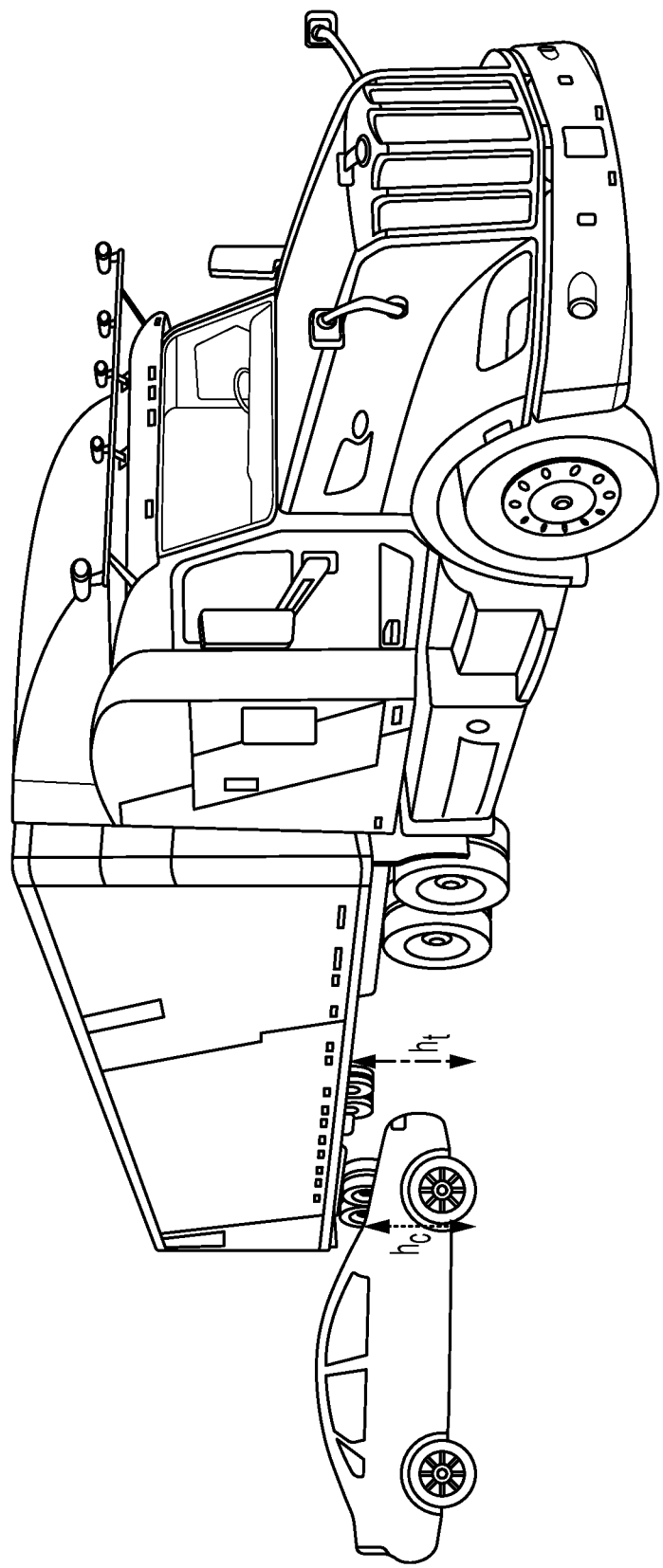
FIG. 6 is a perspective view of a vehicle colliding with a semi-trailer.

Referring now to FIG. 6, vehicle vision system or perception system may recognize possible accident cases based on object classification (e.g., with trucks). When a vehicle such as a car collides with the rear or the side of a semi-trailer, classical pressure sensors and/or accelerometers are highly unlikely to detect the accident or will be very late to detect the collision because the front side of the car (e.g., s sports car or other low profile vehicle) will not hit any obstacle since the height of the car $h_c$ is less than the height of the truck $h_t$. For example, mechanical sensors (e.g., pressure and/or acceleration sensors) are frequently disposed on the bumpers or other edges of the vehicle (which may detect late or may not at all detect a collision in the case of the situation shown in FIG. 6). The perception system may consider this case as a very serious accident since the collision may shear or crush the car cabin.

The perception system may optionally recognize expensive cars that are likely to be in collision. In this scenario, the perception system may increase the financial severity of the case by increasing calibration parameter $K_1$. This functionally may decrease insurance expenses.

Referring now to FIG. 7, traditional systems may deploy airbags for accidents which result in only minor cosmetic damage. This may be a result of either mechanical sensors failing to accurately estimate damage or mechanical sensors have an incorrect and/or low threshold for deploying airbags. Both scenarios are undesired due to the extra cost incurred for a minor collision. In addition, sudden airbag deployment may cause additional damage such as a broken windshield. The perception system described herein more accurately estimates damage from a potential and/or imminent collision, and thus may reduce or eliminate such scenarios. Additionally, the perception system allows relatively slow deployment (yet still fast enough to provide sufficient protection of the passenger or passengers in the vehicle) of airbags as fast deployments may damage passengers and other parts of the vehicles (e.g., the windshield illustrated in FIG. 7).

Thus, the perception system described herein provides a more accurate damage estimation or severity estimation prior to a potential collision because mechanical sensors are noisy and inaccurate estimations are possible (i.e., predicts or estimates a severity and/or magnitude of the collision). The perception system may be fused with mechanical sensors (MS) to provide even better damage estimation. Alternatively, instead of fusion with mechanical sensors, the perception system may be used alone to reduce the number of mechanical sensors the vehicle requires. The system may activate or control one or more safety features of the vehicle based on the estimated severity of the potential collision. For example, the perception system may ameliorate latency requirements of airbag ECUs because current airbag ECU must receive data from sensors, make determinations about the imminent collision, and then deploy airbags, tighten seat belts, etc. in a very short period of time. The perception system may provide the airbag ECU with additional time to perform these actions. As another example, the system may, based on the estimated severity of a collision, reduce an airbag deployment of the airbag (e.g., when the estimated severity of the collision is less than a threshold level).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The sensing system may also include a radar sensor that includes plurality of transmitters that transmit radio signals via plurality of antennas. The radar sensor also includes a plurality of receivers that receive radio signals via the plurality of antennas. The received radio signals are transmitted radio signals that are reflected from an object. The data processor of the ECU is operable to process the received radio signals to sense or detect the object that the received radio signals reflected from.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular safety feature control system, the vehicular safety feature control system comprising:
    a camera disposed at a vehicle equipped with the vehicular safety feature control system, the camera having a field of view exterior of the equipped vehicle, the camera capturing image data;
    an electronic control unit (ECU) comprising electronic circuitry and associated software;
    wherein the electronic circuitry of the ECU comprises an image processor for processing image data captured by the camera to detect presence of objects in the field of view of the camera;
    wherein the ECU, responsive to processing by the image processor of image data captured by the camera, detects an object on a collision course with the equipped vehicle;
    wherein the ECU, responsive to detecting the object on the collision course with the equipped vehicle, classifies the detected object via processing by the image processor of image data captured by the camera;

wherein the ECU estimates a mass of the detected object based on the classification of the detected object;

wherein the ECU estimates a kinetic energy of a potential collision between the equipped vehicle and the detected object based at least in part on the estimated mass of the detected object and an estimated speed of the detected object relative to the equipped vehicle;

wherein the ECU estimates a severity of the potential collision based at least in part on the estimated kinetic energy of the potential collision, and wherein the ECU estimates the severity of the potential collision at least in part by mapping the estimated kinetic energy of the potential collision to a mechanical sensor value, and wherein the mechanical sensor value represents an output of a mechanical sensor of the equipped vehicle during a collision, and wherein the mechanical sensor value was previously stored at the vehicle as a fitted curve of mechanical sensor values to kinetic energy values; and wherein the ECU controls a safety feature of the equipped vehicle based at least in part on the estimated severity of the potential collision.

2. The vehicular safety feature control system of claim 1, further comprising at least one sensor having a field of sensing exterior of the vehicle, and wherein the at least one sensor comprises at least one selected from the group consisting of (i) at least one radar sensor, (ii) at least one lidar sensor and (iii) at least one ultrasonic sensor.

3. The vehicular safety feature control system of claim 1, wherein the ECU estimates the kinetic energy of the potential collision based in part on mass and velocity of the equipped vehicle.

4. The vehicular safety feature control system of claim 3, wherein, responsive to the ECU classifying the detected object as another vehicle, the ECU estimates the kinetic energy of the potential collision based on (i) the estimated mass of the other vehicle, (ii) a mass of the equipped vehicle and (iii) an estimated relative velocity of the other vehicle relative to the equipped vehicle at the potential collision.

5. The vehicular safety feature control system of claim 1, wherein, responsive to the ECU classifying the detected object as a pedestrian, the ECU estimates the kinetic energy of the potential collision based on (i) the estimated mass of the pedestrian, (ii) a mass of the equipped vehicle and (iii) an estimated velocity of the equipped vehicle at the potential collision.

6. The vehicular safety feature control system of claim 1, wherein the ECU estimates the kinetic energy of the potential collision based at least in part on an orientation of the detected object relative to the equipped vehicle.

7. The vehicular safety feature control system of claim 1, wherein the ECU, responsive to estimating the severity of the potential collision and prior to the potential collision occurring, controls the safety feature based on the estimated severity of the potential collision.

8. The vehicular safety feature control system of claim 1, wherein the ECU estimates the severity of the potential collision based on fusing the estimated kinetic energy with mechanical sensor readings.

9. The vehicular safety feature control system of claim 1, wherein the safety feature comprises an airbag controller, and wherein the ECU, responsive to estimating that the severity of the potential collision is less than a threshold level, reduces timing constraints on the airbag controller.

10. The vehicular safety feature control system of claim 1, wherein the safety feature comprises an airbag controller, and wherein the ECU, responsive to estimating that the severity of the potential collision is less than a threshold level, reduces a deployment rate of the airbag and decreases damage caused by an airbag deployment of the airbag.

11. The vehicular safety feature control system of claim 1, wherein the previously stored mechanical sensor value was generated by a mechanical sensor disposed on another vehicle different than the equipped vehicle.

12. The vehicular safety feature control system of claim 11, wherein the mechanical sensor value is based on data from test collisions.

13. The vehicular safety feature control system of claim 1, wherein the previously stored mechanical sensor value was generated by an accelerometer.

14. The vehicular safety feature control system of claim 1, wherein the previously stored mechanical sensor value was generated by a pressure sensor.

15. A vehicular safety feature control system, the vehicular safety feature control system comprising:

a camera disposed at a vehicle equipped with the vehicular safety feature control system, the camera having a field of view exterior of the equipped vehicle, the camera capturing image data;

an electronic control unit (ECU) comprising electronic circuitry and associated software;

wherein the electronic circuitry of the ECU comprises an image processor for processing image data captured by the camera to detect presence of objects in the field of view of the camera;

wherein the ECU, responsive to processing by the image processor of image data captured by the camera, detects an object on a collision course with the equipped vehicle;

wherein the ECU, responsive to detecting the object on the collision course with the equipped vehicle, classifies the detected object via processing by the image processor of image data captured by the camera;

wherein the ECU estimates a mass of the detected object based on the classification of the detected object;

wherein the ECU estimates a kinetic energy of a potential collision between the equipped vehicle and the detected object based at least in part on the estimated mass of the detected object and an estimated speed of the detected object relative to the equipped vehicle;

wherein the ECU estimates the kinetic energy of the potential collision based at least in part on an orientation of the detected object relative to the equipped vehicle;

wherein the ECU estimates a severity of the potential collision based at least in part on the estimated kinetic energy of the potential collision, and wherein the ECU estimates the severity of the potential collision at least in part by mapping the estimated kinetic energy of the potential collision to a mechanical sensor value, and wherein the mechanical sensor value represents an output of a mechanical sensor of the equipped vehicle during a collision, and wherein the mechanical sensor value was previously stored at the vehicle as a fitted curve of mechanical sensor values to kinetic energy values; and wherein the ECU, responsive to estimating the severity of the potential collision and prior to the potential collision occurring, controls a safety feature of the equipped vehicle based on the estimated severity of the potential collision.

16. The vehicular safety feature control system of claim 15, wherein the ECU estimates the kinetic energy of the potential collision based in part on mass and velocity of the equipped vehicle.

17. The vehicular safety feature control system of claim 15, wherein the ECU estimates the kinetic energy of the potential collision based at least in part on an orientation of the detected object relative to the equipped vehicle.

18. A vehicular safety feature control system, the vehicular safety feature control system comprising:
- a camera disposed at a vehicle equipped with the vehicular safety feature control system, the camera having a field of view exterior of the equipped vehicle, the camera capturing image data;
- an electronic control unit (ECU) comprising electronic circuitry and associated software;
- wherein the electronic circuitry of the ECU comprises an image processor for processing image data captured by the camera to detect presence of objects in the field of view of the camera;
- wherein the ECU, responsive to processing by the image processor of image data captured by the camera, detects an object on a collision course with the equipped vehicle;
- wherein the ECU, responsive to detecting the object on the collision course with the equipped vehicle, classifies the detected object via processing by the image processor of image data captured by the camera;
- wherein the ECU estimates a mass of the detected object based on the classification of the detected object;
- wherein the ECU estimates a kinetic energy of a potential collision between the equipped vehicle and the detected object based at least in part on the estimated mass of the detected object and an estimated speed of the detected object relative to the equipped vehicle;
- wherein the ECU estimates a severity of the potential collision based at least in part on the estimated kinetic energy, and wherein the ECU estimates the severity of the potential collision at least in part by mapping the estimated kinetic energy of the potential collision to a fitted curve plotting kinetic energy values versus mechanical sensor values previously stored at the vehicle and derived from crash test data, and wherein the mechanical sensor values represent outputs of a mechanical sensor of the equipped vehicle during a collision; and
- wherein the ECU controls a safety feature of the equipped vehicle based at least in part on the estimated severity of the potential collision.

19. The vehicular safety feature control system of claim 18, wherein the previously stored mechanical sensor values were generated by a mechanical sensor disposed on another vehicle different than the equipped vehicle.

* * * * *